April 2, 1940.  O. L. STARR  2,195,524
THROTTLE CONTROL SYSTEM
Filed Feb. 8, 1938  2 Sheets-Sheet 1
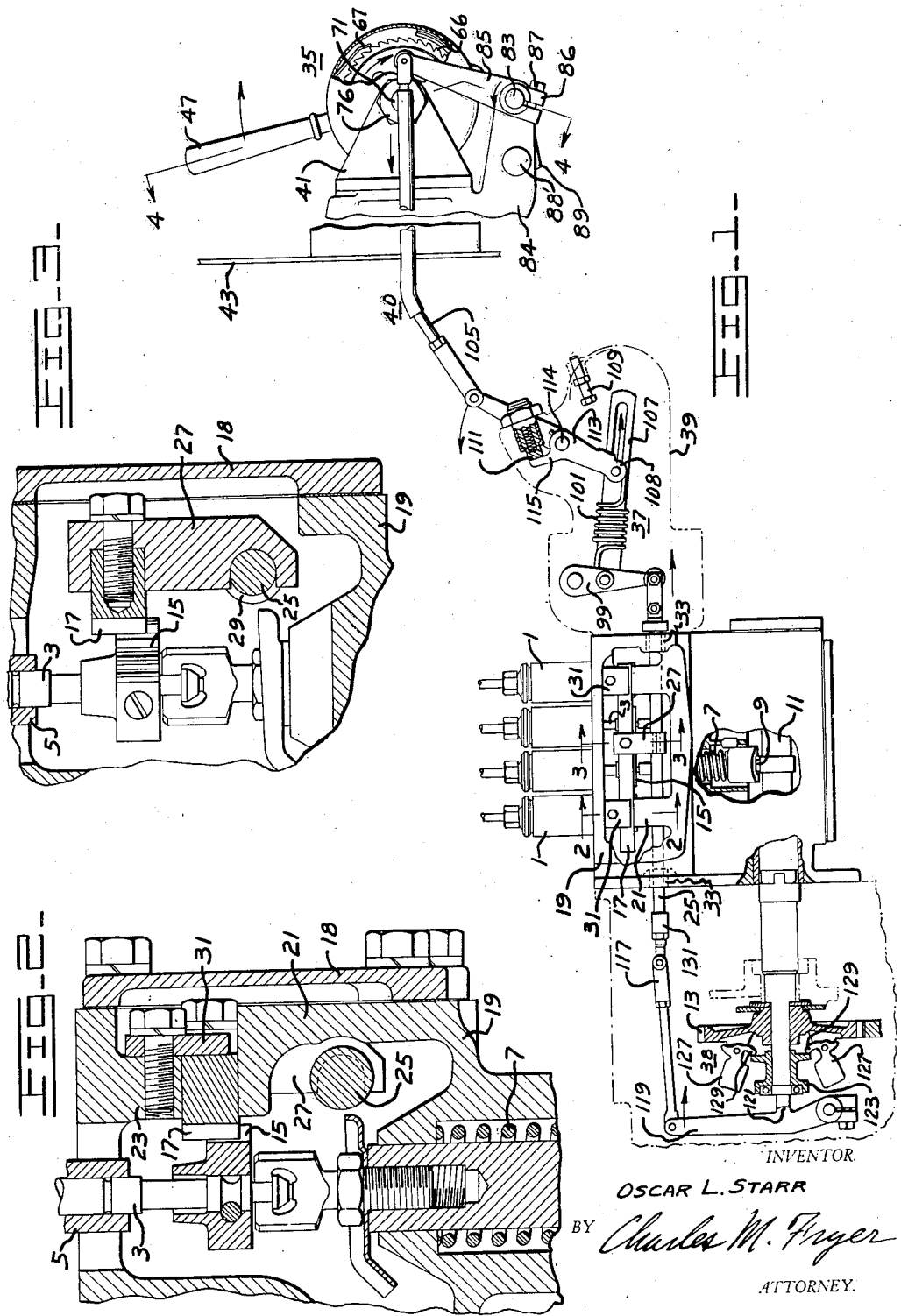
INVENTOR.
OSCAR L. STARR
BY Charles M. Fryer
ATTORNEY.

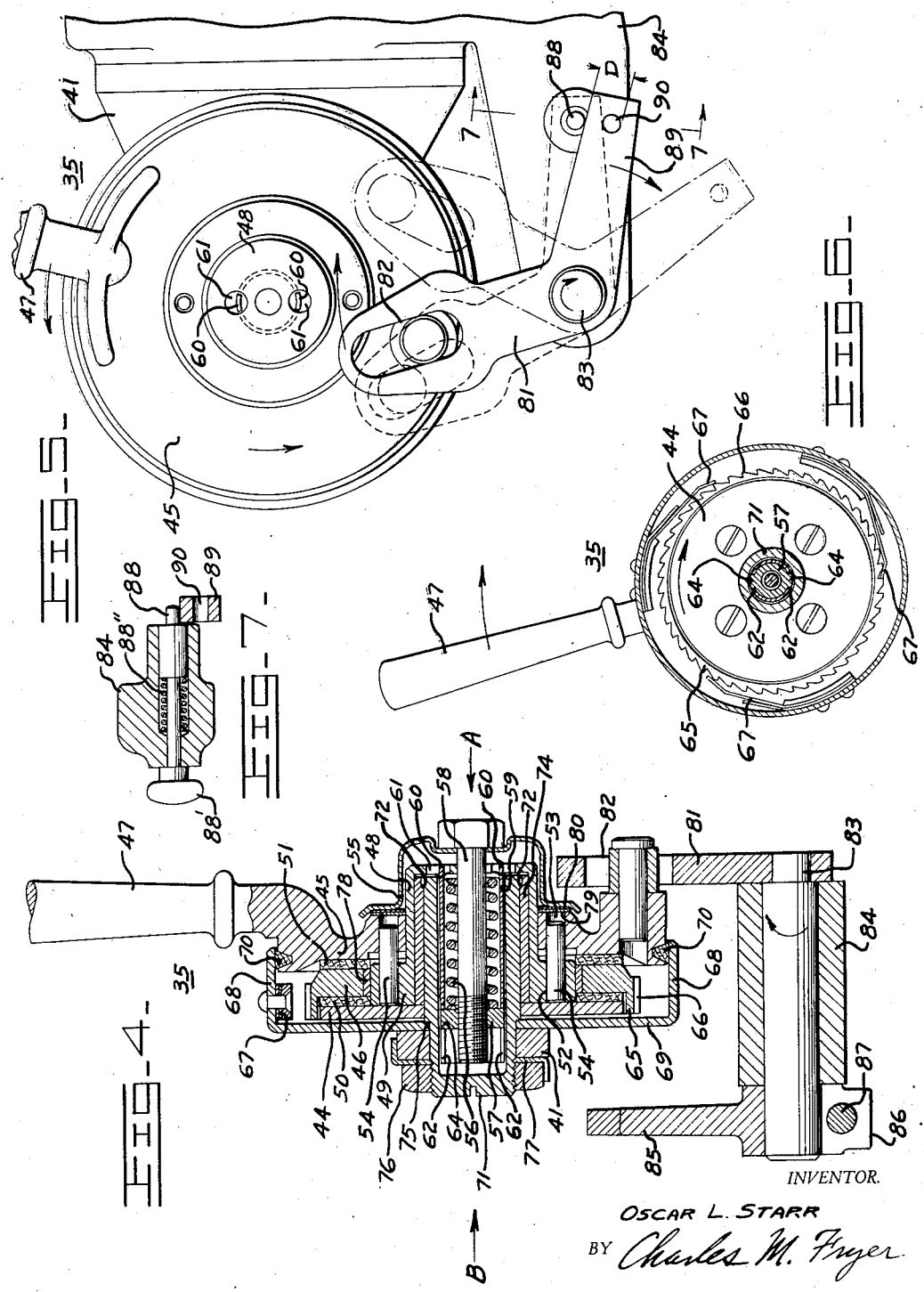

Patented Apr. 2, 1940

2,195,524

UNITED STATES PATENT OFFICE 2,195,524

THROTTLE CONTROL SYSTEM

Oscar L. Starr, Mission San Jose, Calif., assignor to Caterpillar Tractor Co., San Leandro, Calif., a corporation of California Application February 8, 1938, Serial No. 189,353

4 Claims. (Cl. 74—491)

My invention relates to internal combustion engines such as engines of the compression ignition type, and pertains more particularly to the starting, stopping and operation of engines of this character.

In engines of the compression ignition type, fuel in measured quantities is supplied to the cylinders of the engines by pumping means. The quantity of fuel thus supplied varies with the immediate needs of the engine as determined by the load thereon, and is automatically controlled by fuel control means, to maintain a substantially constant engine speed. Such fuel control means may include a spring member which exerts a positive force under tension tending to enlarge the output of the pumping means, and a governor mechanism which functions in response to engine speed to exert a positive force in a direction to restrict the output of the pumping means against the action of the spring which normally tends to increase the output. The actual adjustment of the pumping means prevailing at any instant represents a balanced condition between the two forces, namely, that exerted by the tensioned spring and that exerted by the governor mechanism. Thus, for any change in load on an engine, which change will tend to alter the speed of the engine, the governor mechanism will react accordingly to either develop a resulting positive force to restrict the output of the pumping means against the opposition of the tensioned spring, or relax and permit the spring to exert a positive force to enlarge the output of the pumping means. Whether the governor mechanism or the tensioned spring exercises the controlling force in adjusting the output of the pumping means will depend upon the instantaneous relative magnitudes of the two forces and these in turn will depend upon whether the load on the engine has increased or decreased. If the load has increased, the spring will control, but on the other hand, if the load has decreased then the governor will predominate. When an unbalance of this character occurs, the adjustment of the pumping means will automatically be altered until a balanced condition between the two opposing forces is again realized. Thus, it will be seen that the tendency of the engine to change its speed with a change in load will be counteracted by the operation of the fuel control mechanism in varying the output of the pumping means.

The tension on the spring may be altered manually by providing control means for the purpose, whereby the speed of the engine may be varied at will by an operator. For any particular adjustment of the spring tension, however, the fuel control system functions to maintain the speed of the engine substantially constant at the value determined by such adjustment.

In the non-operating or non-working condition of many engines, the pumping means is usually locked in closed condition due to the fact that a shutdown control is customarily employed for the purpose of shutting off the pumping means from a running adjustment, against the action of a spring, to stop engine operation. Consequently, in preparation for another starting of the engine, the shutdown control must be released to permit the pumping means to open for operation of the engine. In constructions with which I am familiar, the engine shutdown control is independent of the fuel pumping means control previously described, and is provided with separate and independent control means for the purpose.

My invention permits of controlling the running and stopping adjustments of the pumping means of an engine from a single control, and it is accordingly an object of my invention to simplify the starting and stopping and running operation of an internal combustion engine, more particularly one of the compression ignition type:

(1) By providing an improved system for controlling the operation of the fuel pumping means in an engine of this character;

(2) By providing an improved system for governing the operation of the fuel pumping means wherein the number of controls formerly necessary to perform the desired results is reduced through a simplification of apparatus;

(3) By providing an improved means for controlling the speed of an engine;

(4) By providing an improved speed control means requiring no release mechanism to permit manipulation and adjustment;

(5) By providing an improved governor system including a single operator's control for controlling the starting, running and stopping operations of the engine.

Additional objects of my invention will be pointed out in the following description of the same taken in conjunction with the accompanying drawings wherein:

Fig. 1 is a view illustrating the construction of my improved fuel control system as applied to the fuel pumping means of an engine of the compression ignition type.

Fig. 2 is a view in section taken along the line 2—2 of Fig. 1.

Fig. 3 is a view in section taken along the line

3—3 of Fig. 1 to illustrate additional details of the construction.

Fig. 4 is a view in section of the operator's control means, taken in the planes 4—4 of Fig. 1.

Fig. 5 is a side view of the operator's control means in the direction of arrow A of Fig. 4, with a cover removed.

Fig. 6 is a side view of the operator's control means in the direction of arrow B of Fig. 4, with a cover plate broken away.

Fig. 7 is a view in section along the line 7—7 of Fig. 5.

While my invention is not limited to any one specific type of engine, it will be described in connection with its application to an engine of the compression ignition type, wherein fuel is supplied to the cylinders of the engine through suitable fuel injection valves by means of fuel injection pumps.

The specific pump 1 illustrated by me is of the type embodying a plunger 3 which is formed with a scroll (not shown) whereby angular displacement of the plunger will vary the capacity of the pump. The plunger is adapted to reciprocate in a barrel 5 by being actuated in one direction therein against the action of a spring 7, by a tappet mechanism 9, which in turn is operated from a camshaft 11, connected through a suitable gear 13 to the main crankshaft of an engine (not shown). The limit of travel of the plunger is fixed and maintained so by the pump and tappet construction.

The plunger or piston 3 is provided with a gear sector 15 rigidly affixed thereto, and this gear sector is adapted to mesh with a rack 17 slidably mounted in a guideway whereby movement of the rack will in turn be translated into angular movement of the plunger 3 to thereby vary the capacity of the pump 1. The output of the pump is therefore determined by the position of this slidable rack 17, and the position of the rack is in turn determined by the control system which forms the subject matter of my invention.

A plurality of such pumps are supported in an open faced housing 19, the aforementioned guideway being formed between upstanding and complementary depending wall portions 21 and 23 respectively, in the open face of the housing. The rack member 17, which is common to all the pumps and adapted to engage all the gear sectors 15 associated with the pumps, is designed to slide between the upstanding and depending wall portions 21 and 23 in response to movement of a fuel control bar or slide bar 25 to which it is rigidly connected by a link member 27. The link member abuts against a portion 29 of the slide bar of smaller diameter to prevent lateral shifting of the link 27 with respect thereto, and is forcibly held against the slide bar by being bolted at its other end to the rack member 17, the rack member at the same time being maintained in engagement with the gear sectors 15 of the pumps by means of plates 31, bolted to the depending wall portions 23. The apparatus within the housing 19 is protected from exposure to possibility of injury, by a cover plate 18 bolted to the housing 19.

The fuel control bar or slide bar 25 is of a length sufficient to extend lengthwise through the pump housing 19 and is slidably supported in bushings 33 mounted in the end walls thereof. One end of the slide bar is connected to an operator's control means 35, through a lost motion connection 37 mounted within its own housing 39 shown in outline, and a suitable link train 40 interconnecting the control means 35 and the lost motion connection, whereas the other end is interconnected with a governor mechanism 38 to be subsequently described. Movement of the slide bar 25 to the right in Fig. 1, is in the direction which increases the output of the pumps 1, whereas movement of the slide bar 25 to the left decreases the output of the pumps 1.

The control means 35 is fixed to a bracket 41 mounted upon a wall 43 which in the case of a tractor would preferably constitute the dash, and in my improved system it affords an operator a means for manually adjusting the system to obtain a desired speed of operation of the engine. The system, as shown in Fig. 1, is adjusted for idling of the engine.

Customary practice in the design of control means of this general character usually involves a spring pressed pawl mounted in the grip portion of a handle and adapted to engage any one of a number of ratchet teeth formed in an arcuate sector supported upon a bracket whereby the control means may be locked in any one of a number of adjusted positions. Such construction, however, has its drawbacks in that it is sometimes quite difficult to release the spring pressed pawl from its locking engagement with the ratchet teeth. Besides the inconvenience which this may cause an operator, it will be apparent that quick changes in speed adjustment will not always be at his command. Upon release of the locking means, the spring or equivalent usually associated with a governor and which is connected to the control handle so as to place a load thereon tending to move such handle toward the shutoff position, immediately functions to move the handle 47 toward shutdown position, thus putting a burden on the operator to hold the pawl release open and resist the restoring force of the governor spring load until a desired intermediate setting or shutdown position is reached.

The operator's control means 35 which comprises an important part of my invention, in general, is adapted to enable the operator to obtain any desired adjustment without the necessity of operating any release mechanism and maintaining such mechanism in its release condition during the adjustment of the control means. This undesirable feature is eliminated from my construction and an operator is permitted to make his adjustment in one direction or the other merely by exerting pressure against a control handle, thus further enabling an operator to obtain quick or sudden adjustments if need be. At no time does the load of the governor spring initiate the return movement of the control handle. The restoring force is applied by the operator in much the same manner as when initially adjusting the control means, that is, by a positive application of force to the control handle, although the operator is aided in this by the pull of the governor spring which in my improved system is included in the lost motion connection 37. My control means is otherwise designed to adapt it for cooperation with the improved fuel control system of which it forms an important part.

Structurally, my improved control means 35, in the embodiment illustrated, comprises a pair of interconnected disc-like elements 44 and 45 respectively, adapted to frictionally clamp a disc-like element 46 between them. In one direction of movement of the control handle 47 which is connected to one of said interconnected disc-like elements 45, the entire assembly including the frictionally clamped element 46 is adapted to move as a unit, whereas for reverse movement of the control handle 47, the clamped element 46 is locked against return movement with the others. By reason of the fact that the clamped element 46 is locked against reverse movement and is frictionally engaged by the other elements 44 and 45, the control handle 47 is precluded from returning of its own accord from an adjusted position, even though urged in the return direction by the governor spring in the lost motion connection 37, until the operator imparts sufficient pressure to the control handle to overcome the frictional clamping effect of the clamping disc-like elements 44 and 45 against the clamped element 46.

The above described disc-like elements are associated with a housing 48 which is journalled for movement about an axis and has a base flange 49 of substantial thickness to which is fixedly attached for movement therewith, as by machine screws or the like, the disc 44 having mounted on one face thereof a lining 50 of friction material such as brake lining or the like. The other disc-like element 45 to which the operator's handle 47 is preferably integrally formed, is provided with a central opening enabling this disc-like element to be slid over the aforementioned housing 48, and on the surface of this element facing the friction lining 50 of the first mentioned disc 44 is provided a similar lining 51 of friction material.

Aligned openings 52 and 53 are formed both in the base flange 49 of the housing 48 and the disc 45 to which the handle 47 is attached, and these aligned openings are adapted to receive aligning pins 54 to cause the elements 45 and 48 to rotate together. Sufficient clearance is provided between the aligning pins 54 and the disc 45 to which the handle is attached to enable this disc to be slidably supported on these pins. This will permit of the disc 45 being urged in the direction of the first mentioned disc 44 upon the application of pressure thereto, which in the specific embodiment disclosed may be applied by means of a spring actuated cap 55 bearing against the disc 45.

The detailed construction cooperating with the spring actuated cap 55 involves a coil spring 56 positioned within the housing 48 and adapted to bear at one end against the roof of the housing, and at its other end against a nut 57 threaded to a bolt 58 which extends through the pressure cap 55 and the roof of the housing 48 to within the housing, the head of the bolt 58 resting against the pressure cap 55. To enable adjustment of the pressure which the cap 55 exerts against the disc 45, the spring 56 is provided with a sleeve 59, one end of which is formed with a plurality of tabs 60 adapted to extend into openings 61 formed in the roof of the housing 48, to preclude turning of the sleeve 59 with respect to the housing 48. The other end of the sleeve is formed with diametrically opposed slots 62 which are adapted to receive extensions 64 formed on the nut 57 to thereby permit axial movement of the nut with respect to the sleeve at the same time precluding turning of the nut. With this construction, the compression of the spring 56 may be conveniently altered by rotation of the bolt 58 as by the application of a wrench to the head thereof.

Frictionally clamped between the lined surfaces of the opposing discs 44 and 45 is the element 46 also in the form of a disc having a center opening sufficiently large to enable this frictionally clamped disc to fit around the base flange 49 of the housing and journal thereon. The periphery of this disc 46 includes an overhanging rim 65, and is provided throughout its circumference with a plurality of ratchet teeth 66. The overhanging rim 65 extends over the peripheral edge of the disc 44 and acts as a sort of housing for this element.

Stationary spring elements 67 which provide pawls are positioned so as to permit the ratchet teeth 66 when moving in one direction to ride past the pawls, but when relative movement is attempted in the reverse direction, the pawls 67 abut the teeth 66 to preclude reverse movement of disc 46. Pawls 67 are fixedly supported within the flange portion 68 of a stationary casing 69 which is adapted to be slid over and enclose a portion of the control means, the edge of the flange portion 68 resting upon a sealing gasket 70 embedded in a groove formed in the edge of the disc 45 to which the handle 47 is integrally attached. In the embodiment disclosed by me, the pawls 67 are in the form of leaf springs riveted to the under-surface of the flange 68 of the casing 69, their free ends bearing against the rachet surfaces. They are so distributed about the ratchet disc 46 that the free end of each spring contacts a different portion of a tooth. While one spring is abutting the vertical edge of one tooth, another of the springs will be riding on the tip of another tooth, and the end of another spring will be contacting an intermediate point on another tooth. This distribution of the ratchet springs or pawls 67 increases the sensitivity of the ratchet by providing a ratchet effect which would be similar to that obtained were the pawls equally displaced and the ratchet teeth tripled in number. With reference to operation, this means smooth action, sensitive adjustment and substantially no backlash.

The casing 69 is maintained in assembled relationship by means of a hollow bolt 71 extending within the housing 48 about the sleeve 59, and being provided with a shoulder 72 to mesh with a complementary shoulder formed in an edge of a bearing 74 positioned between the housing 48 and the bolt 71, the other edge of the bearing abutting against the disc 44 to preclude endwise movement thereof. This hollow bolt 71 is formed with a threaded end portion of smaller diameter than the main portion of the bolt within the housing, and the casing 69 is adapted to fit over the smaller diameter portion and bear against the shoulder 75 formed thereby, and is clamped in this position between the shoulder 75 and the bracket 41 by a suitable nut 76 threaded to the restricted end of the bolt, and locked in position by a nut lock 77. In order to permit tightening of the nut 76 upon the threaded end of the bolt 71, the end of the bolt has a slot formed therein whereby the bolt may be held with a screw driver while the nut 76 is rotated with a wrench or the like and prior to bending the tabs on the nut lock 77 to lock the nut in position.

Satisfactory operation and wear is assured by a bearing or collar 78 inserted between the ratchet member 46 and the base flange 49 of the housing which it surrounds. Also between the pressure cap 55 and the disc 45 to which the handle is attached, a composite gasket may be applied comprising two layers, the inner layer 79 which bears against the disc, being of a metal such as copper which will permit smooth movement of the disc 45 against the surface and withstand wear, the outer layer 80 of the gasket constituting some satisfactory sealing material such as impregnated paper or composition to preclude entrance of dust or dirt in between the relatively movable parts of the control means.

From the construction thus far described, it will be apparent that movement of the control handle 47 in one direction will produce unitary movement of both discs 44 and 45 and the ratchet element 46 clamped therebetween. Movement in the reverse direction, however, will produce return movement of only the two disc elements 44 and 45 exclusive of the ratchet member 46, the return movement of which is precluded by the fact that one of the pawls 67 will be abutting against a vertical surface of one of the ratchet teeth 66, and the casing 69 to which the pawls 67 are affixed is stationary by reason of being clamped to the bracket 41. The friction between the discs 44 and 45 and the ratchet member 46 is of such magnitude as to require some effort in addition to any load restoring force to provide return movement of the control handle 47 and it is by reason of this frictional engagement that the control handle may be retained in any adjusted position against the influence of any restoring force.

A connecting mechanism including a bell-crank shaped lever 81 is connected at one end to the disc 45 by a pin and slot connection 82, the pin being fitted with a roller to ease the relative movement between the slotted lever 81 and the disc 45. The lever 81 is fixedly secured at another point, as by welding, to one end of a shaft 83 journalled in a spaced integral extension 84 of the bracket 41, the shaft extending beyond the other side of the bracket and providing a support for fixedly securing thereto another lever 85. The manner of affixing this lever to the aforementioned shaft 83 is immaterial and may conveniently be realized by employing a link having a split end, the portions 86 of which are adapted to be brought together by means of a machine screw 87 or the like, thus enabling the link to be clamped to the supporting end of the shaft 83. The free end of the lever 85 is pivotally connected to the link train 40, previously referred to. By reason of this connecting mechanism, it will be appreciated that movement of the control handle 47 will be transferred to the link train 40 to accomplish the desired setting of the control system. The arrows in Figs. 1, 4, 5, and 6 indicate the direction of movement of the respective parts of the control system when the handle 47 is shifted in the direction of its full load setting from no load.

In addition to the construction of the control mechanism thus far described, I also employ means for enabling the control handle 47 to be locked in the position which determines the shutdown condition of the engine, and also provide means which will enable an operator to quickly shift his control handle 47 to determine idling condition of the engine without incurring any danger of accidentally shutting down the engine and without requiring any particular attention or care on his part in making this adjustment.

The above desirable features are realized very simply by providing a pin 88 in the bracket extension 84, the pin having an enlarged head 88' and a length sufficient to extend or protrude beyond the opposite side of the bracket. The pin is normally urged to this position by a spring 88'' and may be conveniently retracted by grasping the head portion 88' and pulling the pin out against the action of the spring 88'. The lever 81 is formed with an extension 89 having a small opening 90 therethrough, of sufficient diameter to receive the pin 88. This extension 89 is so disposed with respect to the position of the control handle 47 that when the pin 88 is retracted and the lever is swung sufficiently to bring the perforation 90 in alignment with the pin so that the pin may engage therein, the engine will be shut down and movement thereafter of the control handle will be precluded, except upon first releasing the lever 81 by retracting the spring actuated pin.

The dimension D of the extension 89 at the point of perforation is of special significance in this connection, in that it is designed to be just sufficient to determine the idling condition of the engine when this portion of the lever 81 is urged into abutment against the pin 88, the adjustment illustrated by the drawings. Thus, it will be apparent that the control system can not be locked accidentally but only when desired since it necessitates first retracting of the spring actuated pin 88 before the control handle 47 can be shifted to its shutdown position. In the operation of the engine, therefore, in the event an operator desires to shift his control mechanism to determine idling of the engine, all he need to do is to urge the control handle 47 to the point where the lever extension 89 abuts against the spring actuated pin 88 and this he can do with full assurance that he will obtain the proper idling adjustment.

The described control means 35 may be effectively used to operate any type of adjusting or control mechanism which places a load thereon when the handle 47 is moved in the direction which results in movement of elements 44, 45 and 46 together as a unit, and the ratchet teeth 66 on the central element 46 ride past the pawl 67 to permit of this unitary movement of elements 44, 45 and 46. Inasmuch as the handle 47 is connected to disc element 45 which is linked to the load attributed to the governor spring and frictionally engages the ratchet disc 46, and inasmuch as said load acts in a direction to cause ratchet teeth 66 to abut one of the spring pawls 67 and prevent rotation thereof in that direction, it will be apparent that when the handle 47 is adjusted to any desired position, the handle 47 will remain fixed in said position.

The mechanism finds particular applicability for controlling the fuel control mechanism or governor mechanism for an engine, and I shall now describe in greater detail its application to my preferred type of governor control system.

The lost motion connection previously referred to, comprises a lever 99 pivoted at its upper end to a wall of the housing 39, and at its other end is linked to the slide bar 25. A coil spring 101 interconnects this lever at an intermediate point with the control handle 47 through the aforementioned link train 40, one of the links 105 being adjustable to provide for proper adjustment of this portion of the control system.

A slotted member 107 formed of strip material, passes axially through the coil spring 101 and connects at one end to the intermediate point on the lever 99 to which the spring 101 is connected, and is in slidable engagement at its slotted portion with the end 108 of the link train connection to the control handle 47. A suitable adjustable stop 109 fixed to a wall of the lost motion connection housing 39 provides means for determining the maximum extent of permissible movement of the link connection terminal 108 in the slotted portion of the member 107, thereby controlling the maximum throw of the control handle 47, which in practice determines full speed operation of the engine. With the handle adjusted to its maximum throw position, sufficient clearance should exist between the slidably connected end 108 of the link train 40 and the end of the slot nearest the stop 109 to enable the control system to take care of situations where the load on the engine falls off, with the control handle adjusted to full speed setting, for then the governor will spread due to increased speed of the engine, and pull the slotted member 107 so that the end nearest the stop 109 will approach the end 108 of the link train.

The other end of the slide bar 25 is connected through an adjustable link 117 to the end of a lever 119 which in turn is so pivoted as to abut at an intermediate point 121 thereon against a collar 123 slidably mounted on an extension of the camshaft 11, the slidable collar 123 constituting a portion of the speed responsive governor mechanism 38 which in addition to the slidable collar, also includes governor flyballs 127 pivotally supported on lateral extensions formed on the camshaft gear 13. Each of the governor balls is provided with an ear 129 against which the slidable collar 123 is adapted to abut, and in so doing, draw the balls inwardly. In response to an increase in speed, and due to centrifugal force induced thereby, the governor balls are adapted to fly apart or spread, resulting in the collar 123 being urged along the shaft against the lever 119 to produce movement of the lever in a direction (to the left in Fig. 1), which reduces the output of the pumps 1.

The various elements involved in the control system described above are so designed that during the non-running condition of the engine, certain relationships and adjustments exist in addition to those already mentioned. With the control handle 47 in the shutdown position (extreme left in Fig. 1 and extreme right in Fig. 5), determined by the locking engagement between the spring actuated pin 88 and the lever extension 89, the slide bar 25 is at one extreme position of its permissible travel (to the left in Fig. 1), wherein all the pumps 1 are closed or shut off. In this position, there is enough latitude for free movement of the collar 123 of the governor mechanism 38 to permit shifting of the slide bar 25 to the right (Fig. 1) to its other extreme position, which will determine a wide open condition of the pumps. In making this shift of the slide bar 25, the collar 123 is urged along the camshaft extension toward the camshaft gear 13, and is prevented from abutting against this gear 13 by arranging a stop nut 131 on the slide bar 25 which, when the slide bar has moved to its extreme position determining the wide open condition of the pumps, will abut against the wall of the pump housing 19, before the collar has an opportunity to strike.

Movement of the fuel control bar or slide bar 25 and rack 17 from one extreme position to the other corresponding to a change in pump adjustment from a closed condition to a substantially wide open condition, is responsive to movement of the control handle 47 from its shutdown position to its idling position, which latter position, as previously explained, is determined when the lever extension 89 abuts the spring actuated pin 88. This movement of the control handle represents but a small portion of the movement of which the control handle is capable before reaching its full speed position as determined by stop 109. Throughout this brief movement of the control handle from shutdown to idling adjustment, the spring 101 remains substantially closed and is designed to have sufficient stiffness to act substantially as a solid connection, although a small amount of stretching might be tolerable. During this operation, it will be noted that the load on the spring, being due merely to the friction encountered in overcoming movement of the slide bar 25 and rack 17 and in opening the pumps, is small due to precision work in the making of these parts.

Further movement of the control handle 47 with the engine still in non-running condition produces no immediate effect other than to tension the spring 101 in proportion to such further movement of the handle, until the handle has reached its maximum limit of throw as determined by the adjustment of the stop 109, the pumps remaining wide open throughout this additional movement of the control handle 47 beyond the idling position. It is apparent that since the engine is in a non-running condition, the flyball governor 38 is inoperative and consequently exerts no influence in what takes place during the throw of the control handle 47 from one position to the other.

Since an engine, in practice, is customarily started with the control handle 47 in a position where the pumps 1 are wide open, that is, with the control handle adjusted somewhere between idling and full speed positions, the engine picks up speed quickly when ignition first occurs and the governor begins to exert its influence upon the pumps by throwing the collar 123 against the lever 119, which in turn effects a pull upon the slide bar 25 in a direction which will be in direct opposition to the direction of pull of the spring 101. The effect of the governor 38, therefore, will be to shift the slide bar 25 and consequently the rack 17 in a direction tending to close the pumps, and the extent to which such movement will take place, will depend upon the tension existing in the spring 101 as initially determined by the setting of the control handle 47. The greater the tension on the spring 101 the less will be the effect of the governor upon the rack 17, until at full speed setting, the effect is small. Consequently, during the conditions just discussed, the rack may be considered as being acted upon by two directly opposing forces, one of which due to the spring 101 acts positively in a direction tending to open the pumps, whereas the other force due to the governor 38 also acts positively but in a direction tending to close the pumps, the final adjustment of the pumps being determined only after a condition of equilibrium has been attained, as this determines the position of the slide bar 25 and consequently the rack member 17.

Movement of the control handle 47 back to its shutdown position from a running position will reverse the operation of the control system. For a portion of its travel back approximately to the point which determines the idling position of the handle 47, when the lever extension 89 is about to abut against the spring pressed pin 88, the resilient connection will be maintained between the control handle 47 and the slide bar 25, the speed of the engine back to this point being controlled by the tension in this resilient connection and the flyball governor. A solid connection between the handle 47 and the slide bar 25 prevails substantially throughout further movement of the handle to its shutdown position, due to the fact that the slidable end 108 of the link train 40 will abut against that end of the slot in the member 107 nearest the lever 99, and the slide bar 25 and consequently the rack 17 will be actuated to an extreme position determining closing of the pumps by the time the handle has reached the end of its travel. Before this last stage of movement of the control handle 47 which determines the actual closing of the pumps can be effected, the spring actuated pin 88 must be first retracted.

To absorb and otherwise ease the force with which the slidable end 108 of the link train connection might abut against the aforementioned end of the slot in the member 107, as when the control handle 47 is returned to its shutdown position, a spring cushioned shock absorbing pin 111 is mounted on the wall of the housing 39 which encloses the lost motion connection, and is adapted to be abutted by one of the elements 113 of the link train which moves about a fixed pivot 114 and formed with an offset 115 for this purpose, contact between the offset 115 and the spring cushioned pin 111 occurring just prior to the moment when the end of the link train abuts against the end of the slot. The shock absorbing device mounting is adjustable to determine the proper moment when the device is to function.

From the above description of my invention, it will be noted that a single throw of the control handle 47 in one direction of its movement, governs both the opening of the pumps 1 and the speed of operation of the engine for any speed from idling speed to full speed, and in its other direction of movement, is effective in slowing down the engine to the extent of shutting it down. During the movement of the control handle from its shutdown position to its idling position, the connection between the control handle and the slide bar 25 is substantially a solid connection in that substantially no stretching of the spring 101 takes place, the spring being sufficiently stiff, as previously stated, to permit sliding of the rack 17 to provide a wide open adjustment of the pumps without stretching of the spring 101. Thereafter, any further movement of the control handle produces a stretching of the spring 101, and the character of the connection between the control handle and the slide bar 25 thus changes and becomes a resilient connection wherein the tension of spring 101 increases from practically zero at the position of the control handle 47 determining idling of the engine, to substantially a maximum at the full speed position of the handle. When the control handle 47 is adjusted to any position in the direction toward the full speed position thereof (indicated by the direction arrow in Fig. 1) all the discs 44, 45, and 46 will move together as a unit because of the frictional engagement between such discs which is effected by the spring 56, and because ratchet teeth 66 will ride past the spring pawls 67; and the handle 47 will remain in its adjusted position by virtue of spring pawls 67 engaging ratchet teeth 66 on ratchet disc 46. In this, the holding of the handle in adjusted position is aided by the governor spring which tends to rotate the ratchet teeth 66 into engagement with the pawls 67. In moving the handle in a reverse direction, as was previously pointed out, ratchet disc 46 will remain stationary by virtue of engagement with the stationary pawls 67. However, in this reverse direction, the movement of control handle 47 is permitted by virtue of the frictional engagement of discs 44 and 45 with the ratchet disc 46, and the handle will be held in adjusted position when adjusted in the reverse direction, by such frictional engagement. The control means 35 thus entails the application of a positive force to the control handle 47 to obtain movement in either direction, and provides the operator with a smooth operating and easily manipulated device for controlling the starting, stopping and speed adjustment of the engine.

Closing of the pumps to shut down the engine can be accomplished only after first retracting the spring actuated pin 88 on the bracket, and this is desirable in order to guard against accidental stalling of the engine in shifting the control handle 47 to idling position.

An additional feature connected with the operation of the control means 35 resides in the fact that the effort required to manipulate the control handle in either direction may be made more or less the same. This is so because the construction and design of the control means 35 is such that when moving the control handle 47 in the direction wherein the ratchet teeth 66 on disc 46 ride past pawls 67 (the direction from idling to full speed position of the handle) the frictional drag resulting from the ratchet teeth 66 riding past the pawls 67, is negligible compared to the pull or restoring force exerted by the governor spring 101 in resisting movement in such direction. Thus, movement in such direction is opposed primarily by the governor spring. But the force required to overcome the frictional engagement between discs 44, 45, and 46 is necessarily greater than the force exerted by the governor spring 101, to enable the control handle to remain immovable with respect to ratchet disc 46 in any adjusted position of the handle without the use of latching mechanism between the control handle and the ratchet disc 46. However, even though such force required to overcome the friction between the discs 44, 45, and 46 is greater, the governor spring 101 serves to provide a force aiding the operator in overcoming such frictional engagement between the discs when the control handle is moved in a reverse direction toward idling position thereof; and by adjustment of the compression of the control unit spring 56, which determines the frictional engaging force between discs 44, 45, and 46, such force may be adjusted to a value whereby the same degree of effort is required to move the control handle in either direction.

While I have disclosed my invention in detail, it is apparent that it is subject to many modifications without departing from the scope of the invention, and I, therefore, do not desire to be limited in my protection to the specific details disclosed, except as may be necessitated by the prior art and the appended claims.

I, therefore, claim as my invention:

1. Control means comprising mechanism movable in either one of opposite directions and including spaced disc-like elements, means for urging said disc-like elements toward each other, a disc-like element clamped between said spaced disc-like elements for movement therewith in one direction of movement of said mechanism, an element maintained in fixed relationship with respect to said clamped element and cooperable therewith to preclude movement thereof in the opposite direction of movement of said mechanism, and a load connecting lever connected to said mechanism.

2. A control system comprising control means including a plurality of relatively movable elements movable as a unit in one direction; means for restraining one of said elements against movement in another direction while permitting movement of a second element of said relatively movable elements in another direction; a controlled member; mechanism interconnecting said second element with said controlled member to translate operation of said second element to said controlled member including means effecting a substantially solid connection between said second element and said controlled member for a portion of the movement of said second element, and a resilient connection between said second element and said controlled member for another portion of movement of said second element.

3. Control means comprising mechanism turnable about an axis including an element turnable in either one of opposite directions about said axis and having a surface extending transversely with respect to said axis, a control handle secured to said element and adapted to be manually grasped for effecting said turning in either one of said opposite directions, a second element also having a surface extending transversely with respect to said axis and which is adapted to engage frictionally said first mentioned surface, means resiliently urging said elements toward each other to maintain said surfaces in frictional engagement for movement of said elements as a unit together when said first mentioned element is turned in one direction about said axis, means for precluding movement of said second element when said first mentioned element is turned about said axis in an opposite direction, and load connecting means connected to said first mentioned element.

4. Control means comprising mechanism turnable in either one of opposite directions about an axis and including a disc-like element having a surface extending transversely with respect to said axis, a second disc-like element also having a surface extending transversely with respect to said axis and which is adapted to engage frictionally said first mentioned surface, spring means exerting an axial thrust for urging said elements toward each other to maintain said surfaces in frictional engagement for movement of said elements as a unit together when the mechanism is turned in one direction about said axis, means for precluding movement of one of said elements when said mechanism is turned about said axis in an opposite direction, and a load connecting lever connected to said mechanism.

OSCAR L. STARR.